(12) United States Patent
Mese et al.

(10) Patent No.: US 9,369,875 B1
(45) Date of Patent: Jun. 14, 2016

(54) ENABLING ANTI-THEFT MODE FOR A MOBILE DEVICE

(71) Applicant: Lenovo (Singapore) Pte. Ltd., Singapore (SG)

(72) Inventors: John C. Mese, Cary, NC (US); Russell S. VanBlon, Raleigh, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/642,568

(22) Filed: Mar. 9, 2015

(51) Int. Cl.
*H04M 1/66* (2006.01)
*H04W 12/08* (2009.01)
*H04W 12/06* (2009.01)
*G01P 13/00* (2006.01)

(52) U.S. Cl.
CPC .............. *H04W 12/08* (2013.01); *G01P 13/00* (2013.01); *H04W 12/06* (2013.01)

(58) Field of Classification Search
CPC .......................... H04M 1/72588; H04W 88/02

USPC ............... 455/418, 411, 456.1, 416, 566; 340/5.83, 539.12; 345/156, 173, 174; 379/88.15, 88.01, 88.03
See application file for complete search history.

(56) References Cited

U.S. PATENT DOCUMENTS

| 2013/0171971 A1* | 7/2013 | Fujii | H04W 12/06 455/411 |
| 2013/0316687 A1* | 11/2013 | Subbaramoo | H04M 1/605 455/418 |

* cited by examiner

*Primary Examiner* — Kiet Doan
(74) *Attorney, Agent, or Firm* — VanLeeuwen & VanLeeuwen; Carlos Munez-Bustamante (57) ABSTRACT

An approach is provided to protect a portable electronic device from use by an unauthorized user. In the approach, a motion at a device is detected, with the motion being caused by someone handling the device. The motion pattern of the device is compared to an expected motion pattern previously configured and stored at the device. In response to the motion pattern matching the expected motion pattern, usage of the device is allowed. However, one or more security actions are performed at the device in response to a mismatch between the motion pattern and the expected motion pattern. The security actions inhibit use of the device.

17 Claims, 6 Drawing Sheets

ENABLING ANTI-THEFT MODE FOR A MOBILE DEVICE

BACKGROUND

Portable devices, such as smart phones, tablet computing devices, and laptop computing devices, are able to store large quantities of information that is often personal, confidential, or otherwise valuable to the device owner. In addition, these small devices are often expensive and costly to replace if the device is stolen. Current security of these portable devices largely centers around a code, such as a password, that is entered before a user can access data stored in the device. However, if the device is not in the secure mode (e.g., password protected, etc.), then someone to takes the device from the owner can access the data. In addition, if the device is taken from an area, such as a table, when the owner is not looking, the owner is unaware that the device has been stolen.

SUMMARY

An approach is provided to protect a portable electronic device from use by an unauthorized user. In the approach, a motion at a device is detected, with the motion being caused by someone handling the device. The motion pattern of the device is compared to an expected motion pattern previously configured and stored at the device. In response to the motion pattern matching the expected motion pattern, usage of the device is allowed. However, one or more security actions are performed at the device in response to a mismatch between the motion pattern and the expected motion pattern. The security actions inhibit use of the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
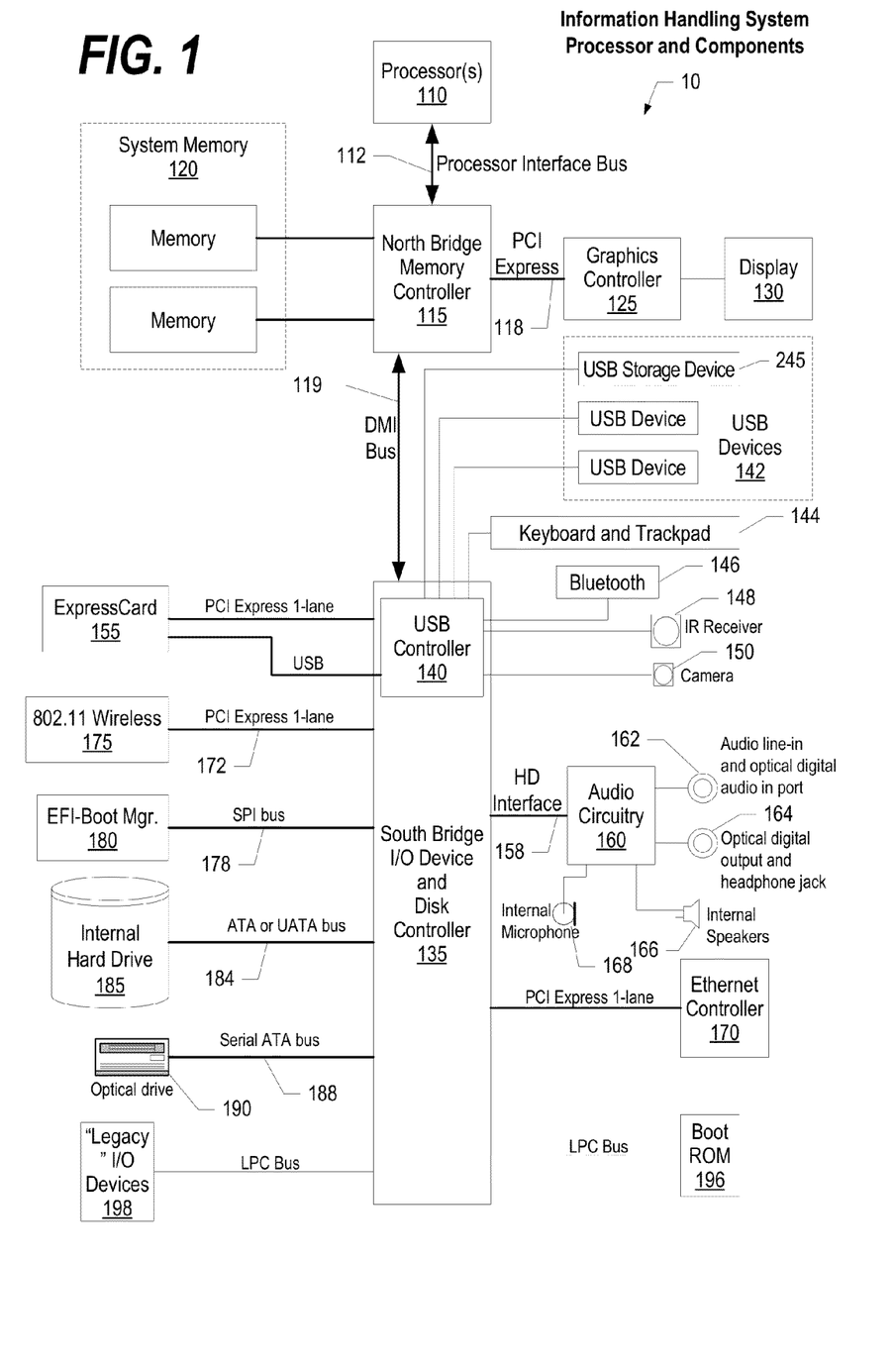
FIG. 1 is a block diagram of a data processing system in which the methods described herein can be implemented.
Figure 2:
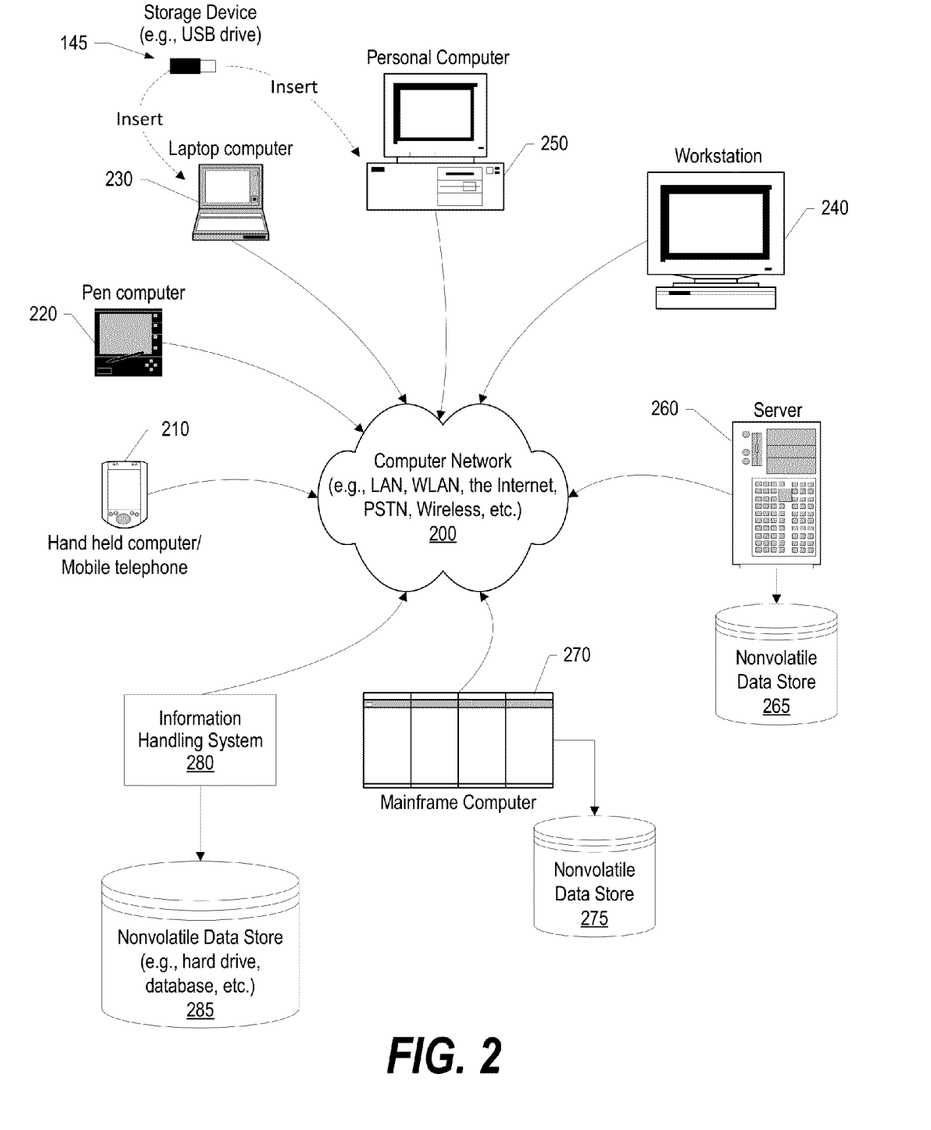
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
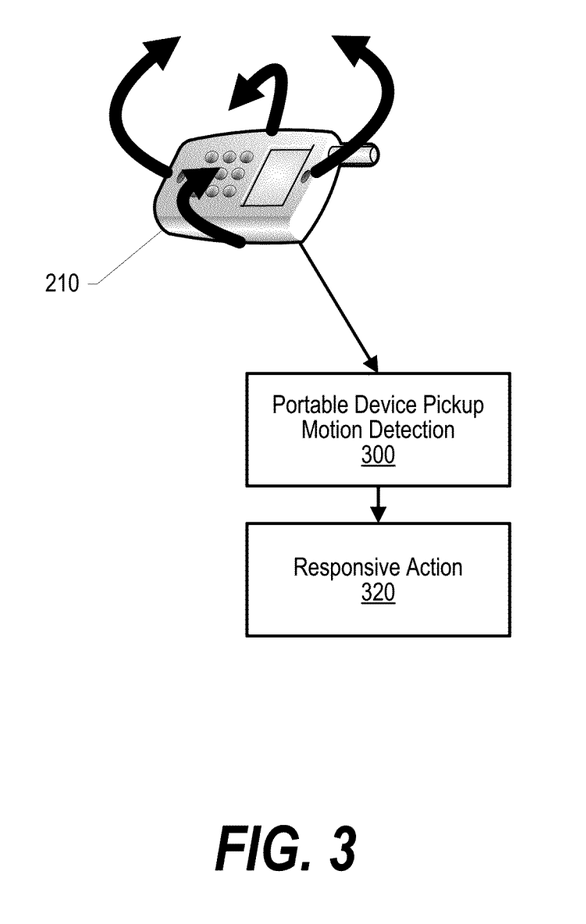
FIG. 3 is a diagram depicting possible motion patterns of a portable electronic device.

FIG. 3 is a diagram depicting possible motion patterns of a portable electronic device. Portable electronic device 210, such as a smart phone or other handheld computing device, is equipped with an accelerometer or other technology that detects movement of the device. When device 210 is not in use by the authorized owner/user, such as when left on a table, a security procedure is enabled to detect movement of the device (process 300). In one embodiment, small movements and movements caused by the portable device (e.g., vibrations, etc.) are disregarded. When a purposeful motion is detected, a responsive action is taken by process 320. The pattern of the motion of the device is compared with an expected pattern. For example, the user might have configured the device to unlock when the device is picked up and then moved in an "X" pattern. If the user handling the device performs the expected "X" pattern, then the device is unlocked for use by the user. However, if the person handling the device does not know that the "X" pattern is expected and, therefore, does not perform the "X" pattern when picking up the portable device, then the responsive action will inhibit the assumedly unauthorized user from accessing most, if not all, of the functionality of the portable device and can perform additional security actions, such as sound an audible alarm, notify the owner or someone else of the event via text message to another device. In this manner, the unauthorized user is unable to access the personal data of the device owner contained on the device. Additionally, because of some security actions, such as sounding an alarm, the unauthorized user may decide to set the device down and not steal the device due to the incriminating alarm being sounded by the device.

Figure 4:
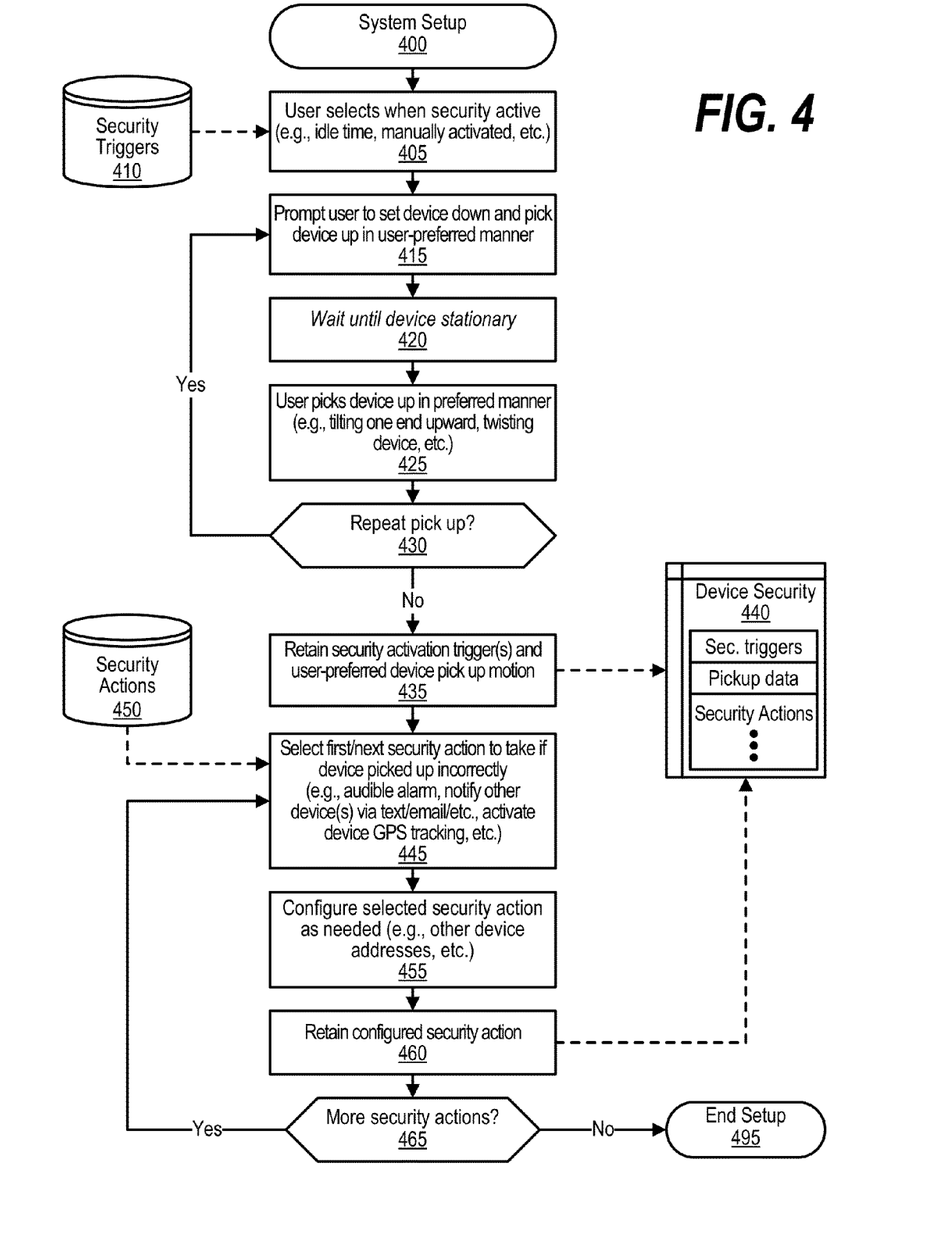
FIG. 4 is a flowchart showing steps taken by a setup process.

FIG. 4 is a flowchart showing steps taken by a setup process. FIG. 4 commences at 400 and shows the steps taken by a process that performs setup processing. At step 405, the users selects when security measures protecting the device should be activated. For example, the user may decide to have the security measures activated when the user has not used the device for some period of time (e.g., five minutes, etc.), when the device has been turned off or manually de-activated by the user, activated by using a manual gesture or action performed by the user on the device, etc. In one embodiment, the security triggers are selected from a list of security triggers that are stored in data store 410.

At step 415, the process prompts the user to set the device down and pick device up in user-preferred manner. For example, the user may decide to pick the device up and move the device in an "X" pattern starting from upper left moving to lower right then back to upper right and moving to lower left. Any pattern may be chosen by the user. At step 420, the process waits until the device stationary before recording the expected security pattern that is about to be received from the user. At step 425, the user picks up the device in the manner preferred by the user (e.g., using the "X" pattern described above, tilting one end of the device upward, twisting the device, etc.). The process determines as to whether to repeat the performance of the expected pattern in order to better train the device regarding the expected motion pattern (decision 430). If a repeat performance is needed for training, then decision 430 branches to the 'yes' branch which loops back to step 415 to repeat the expected motion pattern of the device by the user. This looping continues until the device is properly trained with a high confidence level of the expected motion pattern, at which point decision 430 branches to the 'no' branch for further processing.

At step 435, the process retains the security activation trigger(s) (idle time, etc.) and the expected motion pattern when the user picks up the device after the device has entered the secure device mode. The security triggers and expected motion pattern are stored in memory area 440. At step 445, the user selects the first security action to take if the secured device is picked up without the expected motion pattern. Security actions might include audible alarms, notify other device(s) via text/email/etc., activating device GPS tracking, etc.). The user selects the security action from a list of available security actions stored in data store 450. At step 455, the process configures the selected security action as needed (e.g., other device addresses for communication, audible alarm levels, etc.). At step 460, the process retains the configured security action in the device's memory area 440 along with the security triggers and expected motion pattern data.

The process determines as to whether the user wants to select and configure more security actions (decision 465). If the user wants to select and configure more security actions, then decision 465 branches to the 'yes' branch which loops back to step 445 to receive and process the user's next security action selection as described above. This looping continues until the user no longer wishes to select and figure more security actions, at which point decision 465 branches to the 'no' branch and setup processing ends at 495.

Figure 5:
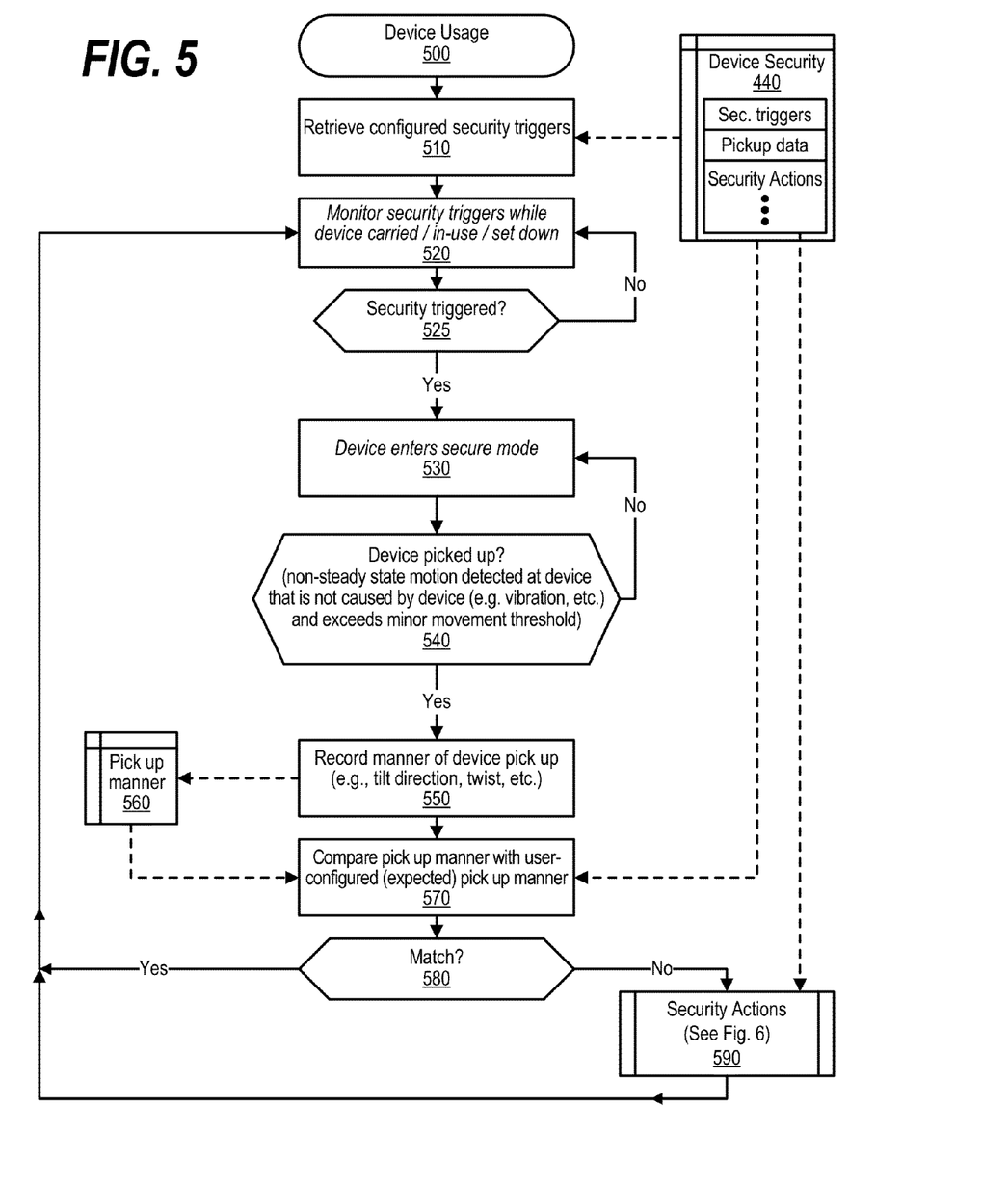
FIG. 5 is a flowchart showing steps taken by a security process during use of the device.

FIG. 5 is a flowchart showing steps taken by a security process during use of the device. FIG. 5 commences at 500 and shows the steps taken by a process that performs device security after the expected motion pattern has been selected as shown in the setup process previously described with respect to FIG. 4. At step 510, the process retrieves the security triggers previously configured for the device as shown in FIG. 4. The security triggers might include an idle time amount, when the device has been turned off or manually de-activated by the user, activated by using a manual gesture or action performed by the user on the device, etc. The security triggers are retrieved from memory area 440.

At step 520, the process monitors the security triggers while device is in operation (carried, in-use, set down, recharged, etc.). The process determines as to whether one of the security settings has been triggered (decision 525). If one of the security settings has not been triggered, then decision 525 branches to the 'no' branch which loops back to step 520 to continue monitoring the device for the activation of one of the security triggers. This looping continues until one of the security settings has been triggered, at which point decision 525 branches to the 'yes' branch whereupon, at step 530, the device enters a secure mode.

The process determines as to whether device has been picked up (decision 540). In one embodiment, the device distinguishes between minor movements, such as those caused by the device itself such as when vibrating, and a deliberate movement caused by handling of the device by a person. If the device is not picked up by someone, then decision 540 branches to the 'no' branch which loops back with the device remaining in the secure mode. This looping continues until the device detects that it has been picked up by someone, at which point decision 540 branches to the 'yes' branch to process the handling of the device. At step 550, the process records the motion pattern of the device as it is picked up (e.g., moved in an 'X' pattern, tilt direction, twist, etc.). The motion pattern of the device as it is picked up by the user is stored in memory area 560. In addition, the motion pattern includes how the device is initially picked up, such as from the surface of a table. For example, the user may have configured the pick up manner to be with one side or corner of the device raised from the surface before other sides or corners.

At step 570, the process compares the motion pattern of the device being picked up with the user-configured expected motion pattern that is retrieved from memory area 440. The process determines as to whether the motion pattern of the device as it is picked up matches the expected motion pattern (decision 580). If the motion pattern of the device as it is picked up matches the expected motion pattern, then decision 580 branches to the 'yes' branch when exits the secure mode and loops back to step 520 with the user being able to use the device and the security triggers being monitored to re-enter the secure mode if a security setting is triggered. On the other hand, if the motion pattern of the device as it is picked up does not match (mismatch) the expected motion pattern, then decision 580 branches to the 'no' branch whereupon, at predefined process 590, one or more security actions are performed (see FIG. 6 and corresponding text for processing details). The security actions in predefined process 590 continue to be performed until an authorized user of the device is able to exit the security actions (e.g., by entering a passcode, etc.), at which point processing loops back to step 520 with the user being able to use the device and the security triggers being monitored to re-enter the secure mode if a security setting is triggered.

Figure 6:
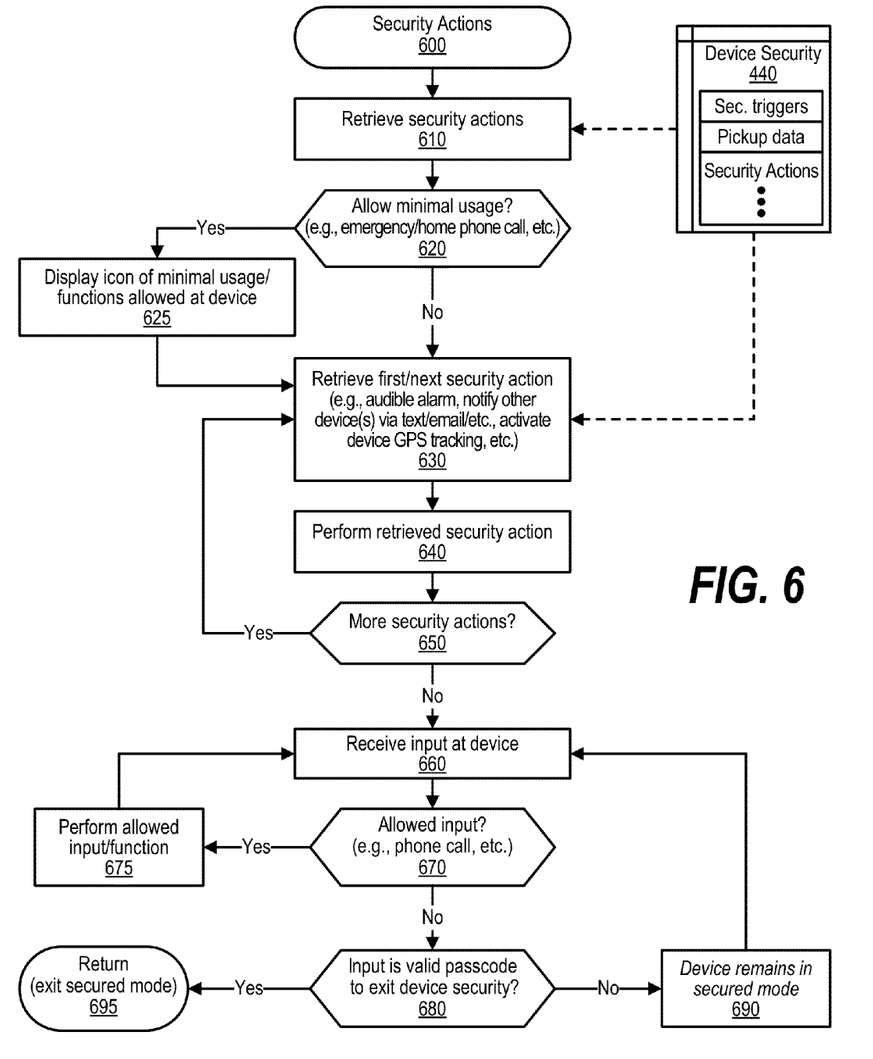
FIG. 6 is a flowchart showing security actions being taken at a device when unexpected handling of the device is detected.

FIG. 6 is a flowchart showing security actions being taken at a device when unexpected handling of the device is detected. FIG. 6 commences at 600 and shows the steps taken by a process that performs configured security actions. This routine is called from FIG. 5 when the device detects that it has been picked up when in a secure mode and the user does not perform the expected motion pattern with the device. At step 610, the process retrieves security actions that are to be performed from memory area 440.

The process determines as to whether the device has been configured to allow minimal usage of the device while in the secure mode (decision 620). If the device has been configured to allow minimal usage of the device while in the secure mode, then decision 620 branches to the 'yes' branch whereupon, at step 625, an icon is displayed allowing the user to perform such minimal functionality (e.g., perform '911' emergency call, etc.). On the other hand, if the device has not been configured to allow minimal usage of the device while in the secure mode, then decision 620 branches to the 'no' branch bypassing step 625.

At step 630, the process retrieves the first security action configured by the user from memory area 440. Security actions inhibit use of the device and might also be configured to sound an audible alarm, notify other device(s) via text/email/etc. that the device has been picked up, activate device GPS tracking, and the like. At step 640, the process performs the retrieved security action. The process determines as to whether more security actions were selected and configured during setup processing (decision 650). If more security actions were selected and configured during setup processing, then decision 650 branches to the 'yes' branch which loops back to retrieve and perform the next security action. This looping continues until there are no more security actions to be performed, at which point decision 650 branches to the 'no' branch and processing continues.

At step 660, the process receives an input at device, such as a selection of an emergency call icon or entry of a passcode. The process determines as to whether the input is allowed, such as making an emergency call (decision 670). If the input is allowed, then decision 670 branches to the 'yes' branch whereupon, at step 675, the process performs the allowed function, such as the making of an emergency call. On the other hand, if such input is not allowed, then decision 670 branches to the 'no' branch for further processing. The process determines as to whether the input is the entry of a valid passcode to exit device security (decision 680). If an incorrect passcode is entered, then decision 680 branches to the 'no' branch whereupon processing loops back to step 660 to receive the next input from the current user of the device. During the looping, the performance of any triggered security actions may continue, such as the audible playing of an alarm, tracking of the device using GPS, etc. This looping continues until the valid (correct) passcode is entered by the user, at which point decision 680 branches to the 'yes' branch and processing exits the secured mode of the device and returns to the calling routine (see FIG. 5) at 695.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method comprising:
   detecting a pick-up motion at a previously stationary device when the device is picked up by a user;
   comparing a motion pattern of the pick-up motion to an expected motion pattern configured at the device;
   allowing usage of the device in response to the pick-up motion pattern matching the expected motion pattern; and
   performing one or more security actions at the device in response to a mismatch between the pick-up motion pattern and the expected motion pattern, wherein the security actions inhibit use of the device;
   wherein the expected motion pattern is configurable, and the method further comprises: receiving the expected motion pattern at the device from a user; and
   storing the expected motion pattern in a memory included in the device.

2. The method of claim 1 further comprising:
   receiving one or more security actions from the user, wherein at least one of the security actions comprises sounding an audible alarm, notifying at least one other device, and activating a GPS tracking of the device.

3. The method of claim 1 further comprising:
   entering a secure mode at the device prior to the detecting, wherein the secure mode is entered after a period of non-use of the device.

4. The method of claim 3 wherein the detecting further comprising:
   determining that the detected motion of the device exceeds a minor motion threshold and was caused by a handling the device.

5. The method of claim 1 further comprising:
   after commencement of the security actions, receiving a passcode at the device from a user;
   comparing the received passcode with an expected passcode stored in a memory of the device; and
   in response to the received passcode matching the expected passcode, ceasing performance of the security actions and allowing use of the device by the user.

6. The method of claim 5 wherein inhibiting the use of the device allows use of the device to enter the passcode to cease performance of the security actions and further allows performance of a subset of emergency functions at the device while performing the security actions.

7. A device comprising:
   one or more processors;
   a memory coupled to at least one of the processors; and
   a set of instructions stored in the memory and executed by at least one of the processors to:
   detect a pick-up motion at the device, wherein the device was previously stationary prior to the detected pick-up;
   compare a motion pattern of the pick-up motion to an expected motion pattern configured at the device and stored in the memory;
   allow usage of the device in response to the pick-up motion pattern matching the expected motion pattern; and
   perform one or more security actions at the device in response to a mismatch between the pick-up motion pattern and the expected motion pattern, wherein the security actions inhibit use of the device;
   wherein the expected motion pattern is configurable using further actions comprising: receive the expected motion pattern at the device from a user; and
   storing the expected motion pattern in a memory included in the device.

8. The device of claim 7 wherein the actions further comprise:
   receive one or more security actions from the user, wherein at least one of the security actions comprise sounding an audible alarm, notifying at least one other device, and activating a GPS tracking of the device.

9. The device of claim 7 wherein the actions further comprise:
   enter a secure mode at the device prior to the detecting, wherein the secure mode is entered after a period of non-use of the device.

10. The device of claim 9 wherein the detection of the motion comprises an actions of:
    determine that the detected motion of the device exceeds a minor motion threshold and was caused by a handling the device.

11. The device of claim 7 wherein the actions further comprise:
    after commencement of the security actions, receive a passcode at the device from a user of the device;
    compare the received passcode with an expected passcode stored in a memory of the device; and
    in response to the received passcode matching the expected passcode, cease performance of the security actions and allow use of the device by the user.

12. The device of claim 11 wherein inhibiting the use of the device allows use of the device to enter the passcode to cease performance of the security actions and further allows performance of a subset of emergency functions at the device while performing the security actions.

13. A computer program product comprising:
    a computer readable storage medium comprising a set of computer instructions, the computer instructions effective to:
    detect a pick-up motion at a previously stationary device when the device is picked up by a user;
    compare a pick-up motion pattern of the motion to an expected motion pattern configured at the device and stored in the memory;
    allow usage of the device in response to the pick-up motion pattern matching the expected motion pattern; and
    perform one or more security actions at the device in response to a mismatch between the pick-up motion pattern and the expected motion pattern, wherein the security actions inhibit use of the device;
    wherein the expected motion pattern is configurable using further instructions comprising: receive the expected motion pattern at the device from a user; and
    storing the expected motion pattern in a memory included in the device.

14. The computer program product of claim 13 wherein the set of instructions further comprise instructions effective to:

receive one or more security actions from the user, wherein at least one of the security actions comprises sounding an audible alarm, notifying at least one other device, and activating a GPS tracking of the device.

15. The computer program product of claim 13 wherein the set of instructions further comprise instructions effective to:
enter a secure mode at the device prior to the detecting, wherein the secure mode is entered after a period of non-use of the device.

16. The computer program product of claim 15 wherein the detection of the motion comprises further instructions effective to:
determine that the detected motion of the device exceeds a minor motion threshold and was caused by a handling the device.

17. The computer program product of claim 13 wherein the set of instructions further comprise instructions effective to:
after commencement of the security actions, receive a passcode at the device from a user of the device;
compare the received passcode with an expected passcode stored in a memory of the device; and
in response to the received passcode matching the expected passcode, cease performance of the security actions and allow use of the device by the user.

\* \* \* \* \*